INVENTOR
PAUL VULLIEZ
By Irwin S. Thompson
ATTY.

May 8, 1962  P. VULLIEZ  3,033,513
HIGH-SPEED UNIVERSAL CONTROL SYSTEM FOR ROTARY VALVES
ASSUMING TWO SUCCESSIVE MOVEMENTS
Filed Dec. 28, 1959  8 Sheets-Sheet 3
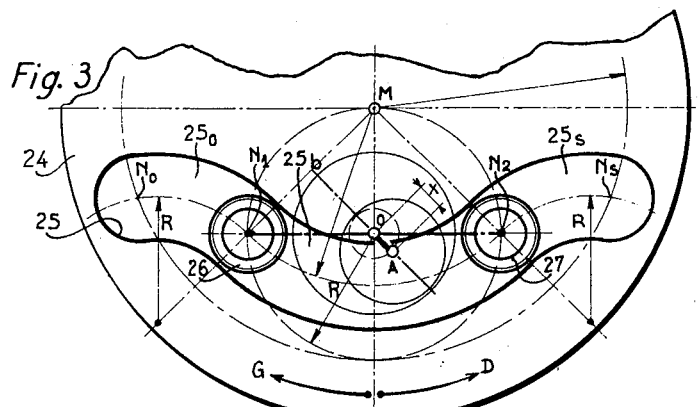
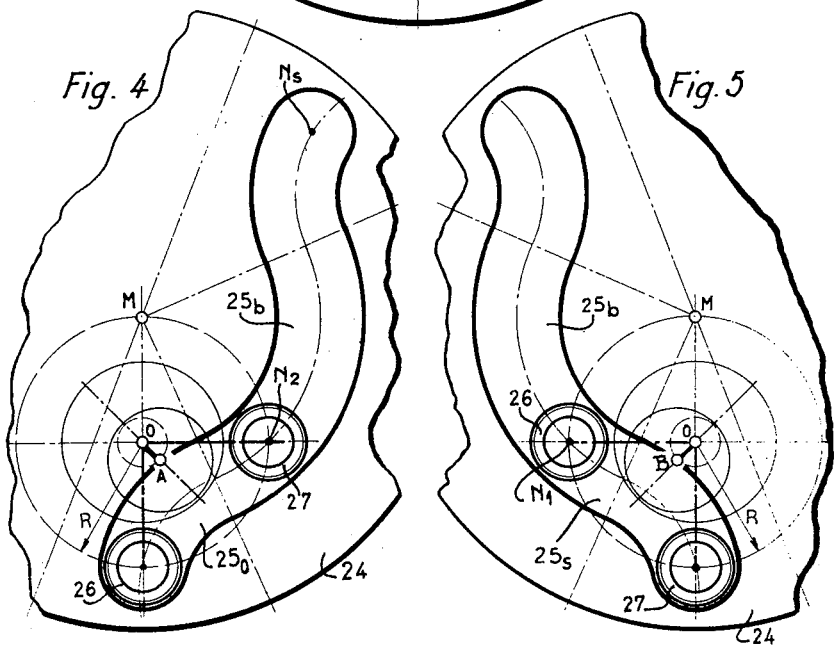
INVENTOR
PAUL VULLIEZ
By Irwin S. Thompson
ATTY.

May 8, 1962 P. VULLIEZ 3,033,513
HIGH-SPEED UNIVERSAL CONTROL SYSTEM FOR ROTARY VALVES
ASSUMING TWO SUCCESSIVE MOVEMENTS
Filed Dec. 28, 1959 8 Sheets-Sheet 4

INVENTOR
PAUL VULLIEZ
BY Irwin S. Thompson
ATTY.

INVENTOR
PAUL VULLIEZ
By Irwin S. Thompson
ATTY.

United States Patent Office 3,033,513
Patented May 8, 1962

3,033,513
HIGH-SPEED UNIVERSAL CONTROL SYSTEM FOR ROTARY VALVES ASSUMING TWO SUCCESSIVE MOVEMENTS
Paul Vulliez, 48 Rte. de Rouen, Pont-Audemer, France
Filed Dec. 28, 1959, Ser. No. 862,368
Claims priority, application France Jan. 16, 1959
19 Claims. (Cl. 251—163)

In the case of rotary cock valves, the movable closing member is subjected to an angular shifting of a predetermined magnitude, say by one quarter of a revolution between its open and closed positions. This is the case, in particular, for spherical valves, throttle valves and valves incorporating a frusto-conical plug inside a shell.

In order to operate under good conditions, a first angular shifting is performed without any friction between the movable fluidtightly closing member and the body of the valve, starting from the open position of the valve up to an intermediate transient position prior to the actual closing; said first movement is followed by a second so-called nearing movement bringing the movable fluidtight member after a stopping of its angular movement out of its intermediate transient position into its closing position; this cuts out thus any friction acting detrimentally on the fluidtight members.

However, such known valves adapted to execute two movements show the drawback of requiring a difficult operation and being of an intricate execution.

My invention has for its object a high-speed universal control system for valves assuming a dual movement of the type disclosed, said system requiring only a very simple operation, both for closing and for opening the valve, whereas its execution is an easy matter and leads to a strong and reliable arrangement.

According to my invention a first control member ensures the angular movement of the closing member and a second member ensures the nearing movement and both control members are revolvably mounted round a common first axis, while the sequence of the control operations is ensured by a positively acting cam revolvably mounted with reference to a second axis parallel to and independent of the first axis. Said cam includes a groove which may be open or closed at least at one end and which is formed by two terminal sections connected through a central section. The terminal sections engage respectively the control member producing the angular movement and the control member producing the nearing movement. The central section produces the alternating locking of each control member; its outline is circular and has its center on said second axis, while its ends are defined by the position of the corresponding control members when one of the dual movements is at an end and before the second movement is initiated. During a complete closing or opening operation, one of the control members is thus held fast, while the other is carried along, and reversely. The connection between each terminal section and the central section may be performed advantageously along an arc of a circle of which the radius is equal to that of the rotary movement of the control members round the first axis.

The spacing between the two axes may be lower than, equal to or larger than the radius of gyration of the control members. The second axis may be, in fact, shifted towards infinity, in which case the cam assumes a translational movement.

According to further features of my invention, the control member for angular movement is coupled with the movable member of the valve through a sliding connection provided with a clearance or otherwise while the control member producing the nearing movement is connected with the closing member through a rotary connection having a center geometrically eccentric with reference to the first axis, said connection being of the nut and screw or any other suitable type.

I will now describe various embodiments of my invention, reference being made to the accompanying drawings, wherein:

FIG. 3 is a view of the control cam in its transient position prior to closing, said cam being shown cross-sectionally through line III—III of FIG. 1.

FIGS. 4 and 5 are views similar to FIG. 3, showing the control cam, respectively for the open position and for the closed position of the valve.

Figure 1:
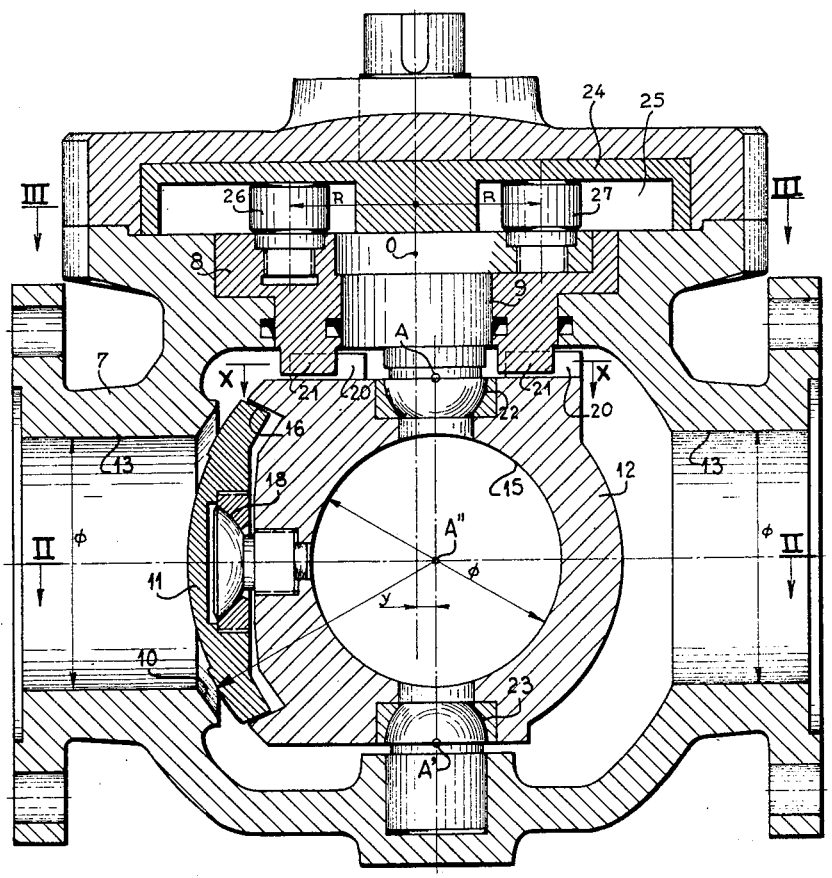
FIG. 1 is a view of a spherical valve provided with a control system according to my invention, said view being a cross-section through line I—I of FIG. 2.
Figure 2:
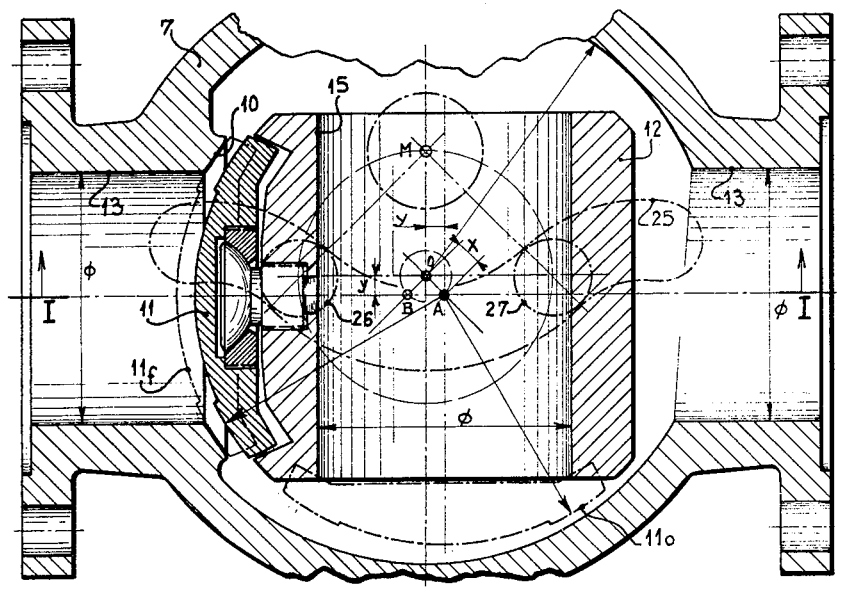
FIG. 2 is a corresponding cross-sectional view of said valve through line II—II of FIG. 1.

In the embodiment illustrated in FIGS. 1 to 5, showing, by way of example, the invention as associated with a spherical valve adapted to execute a quarter of a revolution, providing a direct passage after assuming two successive movements, the body of the valve is shown at 7 in FIGS. 1 and 2, while the pipes to be controlled for communication or disconnection by the valve are shown at 13. The plug 12 forming the movable closing member of the valve carries, through the agency of two rotulas 16 and 18, a self-centering cover or cap 11 adapted to engage a seat 10 formed at the entrance of one of the pipes 13. The plug 12 is provided with a central passageway 15, the diameter of which $\phi$ is equal to that of the pipes 13.

The control of the two successive angular and nearing movements of the plug is ensured by two control members constituted by the levers 8 and 9 pivotally secured to the body 7 round the same stationary axis O and extending preferably along the same operative radius R. In the example illustrated, the lever 8 controlling the angular movement of the plug 12 surrounds the member or lever 9 controlling the nearing movement of the plug 12.

Figure 2A:
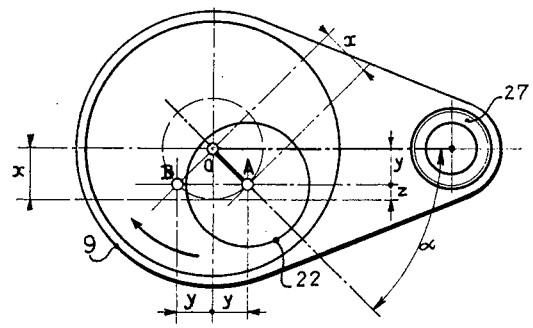
FIG. 2a is a view on a larger scale of a detail of FIG. 2.

The member 8 controlling the angular movement of the plug is coupled with the latter through a slideway connection 20—21, while the member 9 controlling the nearing movement is connected with said plug 12 through an eccentric connection, i.e. a rotary connecting member 22, the geometrical center A of which is arranged eccentrically of the rotary axis O (FIG. 2a). In the example illustrated and for the position shown in FIGS. 1 and 2, said center A is in vertical registry with the center A″ of the plug 12, which center is also the center of the outer spherical surface of the cover 11 and lies also on the axis of the pipes 13.

The eccentricity OA designated by $x$ in FIGS. 2 and 2a is in the position illustrated at an angle $\alpha = 45°$ with reference to the axis of the pipes 13 and it is projected at a distance $$y = x \frac{\sqrt{2}}{2}$$

on said axis. Said eccentricity OA is illustrated on an exaggerated scale so as to make the reading of the drawing easier.

In the example illustrated in FIG. 1, the connections 20—21 and 22 are arranged at the upper end of the plug 12. The connection 22 is constituted, as illustrated in FIG. 1, by a spherical rotula having its center at A, said rotula forming the eccentric control member providing the nearing movement. As apparent, more particularly from inspection of FIG. 1, the arrangement includes in addition to the rotula 22, a part-spherical rotula 23 connecting the lower section of the plug 12 with the valve body 7. The rotula 23 which sets the position of the lower end of the plug 12 allows said plug to move freely between its different positions under the action of the dual movement-controlling system acting on the upper section of the plug 12. The center of the rotula 23 may assume any desired position; for instance, it may be located at a point A′ in vertical registry with the point A in the position illustrated in FIGS. 1 and 2, or else, on the axis O or in any other desired location.

The operation providing for the closing of the plug 12 is performed through two successive movements or in two periods, as disclosed hereinafter:

A first period for angularly setting the plug as controlled by the rotation of the lever 8, while the lever 9 is held fast. Through the agency of the coupling slideway 20—21, the plug is driven into rotation round the center A of the eccentric rotary connection 22 which is transiently held fast in space, by reason of the lever 9 being held against motion. The plug 12 is thus brought from its open position defined by the location $11_0$ drawn in dot-and-dash lines in FIG. 2 for the cover 11, for which position the passageway 15 in the plug is in accurate registry with the pipes 13, into a transient intermediate position illustrated in solid lines in FIG. 2 and for which the cover 11 registers with the seat 10 and is slightly spaced with reference to the latter. In the example illustrated, said rotary movement has an amplitude of 90°, i.e. one quarter of a revolution.

A second period for nearing the plug with reference to the cooperating seat, as provided by the rotation of the lever 9, while the lever 8 is held fast. Through the agency of the eccentric member 22, the geometrical center A of which is adapted to move round the axis O starting from the position A towards B, as illustrated in FIGS. 2 and 2a, the plug 12 moves nearer the seat 10, while retaining the desired angular setting, as provided by the slideways 20—21, the section 21 of which is transiently held fast in space by the lever 8 which is now stationary. The plug 12 is thus brought from its intermediate or transient position into its closed position illustrated by the location $11_f$, drawn in dot-and-dash lines, of the cover 11 in FIG. 2, for which position the cover engages the seat 10.

It should be remarked that, with the rotula structure 22—23 illustrated in FIGS. 1 and 2, the plug revolves round the axis A—A′ during the angular movement thereof, after which it assumes, during the nearing period, a pendular movement round its lower apex A′, the upper end of said pendular movement extending along the arc of a circle AB. It should be remarked also that the self-centering fitting of the cover 11 at 16 and 18 with reference to the corresponding recess in the plug allows, in spite of such a dissymmetrical nearing movement, a perfect engagement between the said cover and its seat 10.

The rotary and nearing movements are provided in succession in the order defined by the preceding paragraphs during the closing operation and in a reverse sequence and in a reverse direction during the opening of the valve, as provided by the timing obtained through the rotary members 8 and 9. Said movements are controlled, as illustrated in FIGS. 1 to 5, by a positively acting cam 24 revolvably mounted with reference to a stationary axis M, which is parallel to and spaced with reference to the axis O. The positively acting cam 24 is provided with a groove 25 engaged by a roller 26 revolvably carried by the rotary member 8 controlling the angular setting of the plug and by a roller 27 forming the operative member revolvably carried by the rotary member 9 controlling the nearing movement.

The groove 25 illustrated more clearly in FIG. 3 includes a first terminal section $25_0$ providing for the angular movement of the plug, extending between the points $N_0$ and $N_1$ and cooperating with the roller 26 on the rotary member 8 controlling said angular movement of the plug; the groove 25 includes further at its other end a second terminal section $25_s$ extending between the points $N_2$ and $N_s$ and which cooperates with the roller 27 on the rotary member 9 to provide, through the latter, the nearing movement of the plug. Said sections $25_0$ and $25_s$ are connected through a central locking section $25_b$ assuming an arcuate shape, the center of which lies exactly on the axis M. The limit positions $N_1$ and $N_2$ of the central section are engaged respectively by the axes of the rollers 26 and 27 of the rotary members 8 and 9 at the moment separating the two movements, as illustrated in FIG. 3, i.e., after one of the movements has been executed and before the other has begun. With such an outline for the cam and for said transient or intermediate position, the radii $ON_1$ and $ON_2$ form an angle of 180° with reference to each other.

In the position corresponding to the open condition of the valve illustrated in FIG. 4, the roller 26 lies at the outer end of the angularly setting section $25_0$ while the nearing roller 27 remains fast at $N_2$ inside the locking section $25_b$. When it is desired to close the valve, it is sufficient to turn the positively acting cam 24 clockwise. The angularly setting section $25_0$ urges the roller 26 into movement along the path defined by it and produces a rotary movement of the member 8 carrying said roller, while the roller 27 and the associated rotary member 9 are held fast by the locking section $25_b$ of the groove. The plug 12 is thus constrained to execute its angular movement in the manner described hereinabove.

The first movement thus begun continues until the roller 26, having rotated through 90° round the axis O, enters the position $N_1$, while the roller 27 remains fast in space at $N_2$, as shown in FIG. 3. The continuation of the rotation of the cam 24 constrains the roller 26 to engage the locking section $25_b$ of the groove, while the nearing section $25_s$ engages the roller 27, whereby the member 8 is now held fast and the member 9 is urged into rotation. The plug executes thus its nearing movement, whereby it comes in contact with the seat 10 in the manner disclosed. Said movement continues until complete tightening is obtained (FIG. 5).

The opening of the valve to make it move between the position illustrated in FIGS. 4 and 5, is performed through an operation in an exactly opposed direction. It will be remarked that a mere rotation of the cam 24 provides the proper execution of the two movements of the valve, both for opening and for closing. It will be remarked also that, in the intermediate position illustrated in FIG. 3, which is a position of symmetry for the cam 24, the rollers 26 and 27 are subjected to a force acting at 45° with reference to the normal to the radii $N_1O$ and $N_2O$. Said angle of engagement which is quite acceptable, appears only for a very short angular fraction of the movement of the cam, since, as soon as the latter has moved by a few degrees away from the transient position, said angle approximates 90° and is therefore excellent throughout the remainder of the operative rotary movement of the cam. It will also be noticed that, for the symmetrical position illustrated in FIG. 3, the control is performed in a perfectly non-reversible manner, since the reaction of the rollers 26 and 27 on the groove 25 extends along a line passing through the point M.

Figure 8:
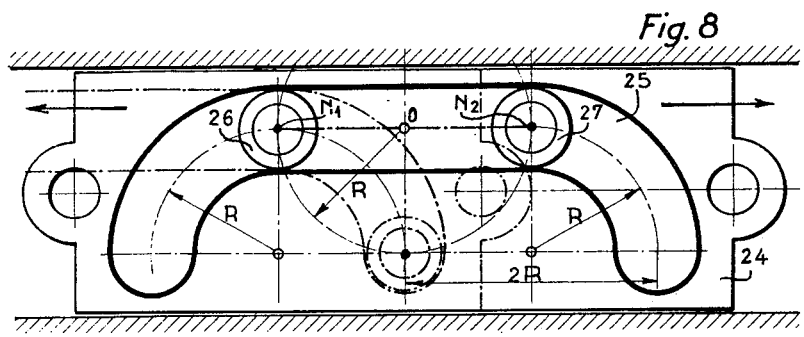
FIGS. 6, 7 and 8 are similar to FIG. 3 and relate to various modifications of the cam.
Figure 6:
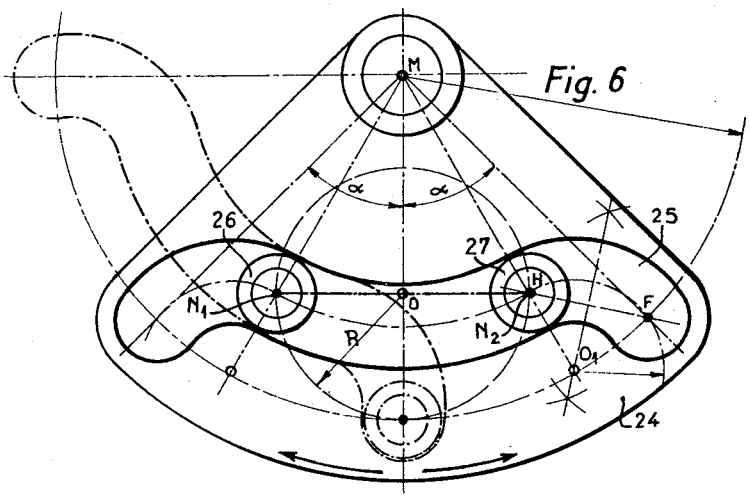
Figure 7:
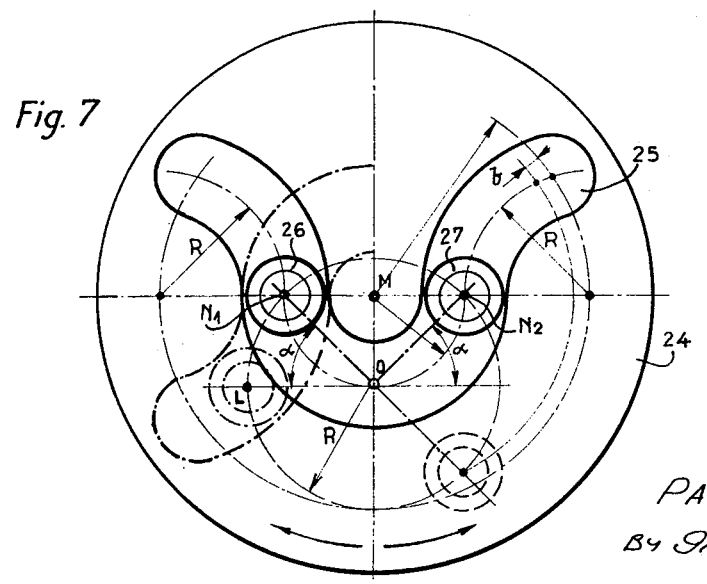

In the example illustrated in FIGS. 1 to 5, the spacing MO between the axes is selected as equal to the radius R of gyration of each of said rollers 26 and 27 round the axis O and the positively acting cam has to execute a rotation of 137°50′ round the axis M for a complete cycle of operation including a rotation of 90° round the axis O for each of the rotary members 8 and 9. Obviously, my invention is not limited to such values and allows resorting to any other suitable spacing between the axes. Thus, as illustrated in FIG. 6, OM may be larger than R and be equal to $R\sqrt{3}$, for instance. In this case and retaining a value of 45° for the angle α, the complete rotation of the cam throughout a complete operative cycle is equal only to 90°. The point M may even be shifted infinitely far, as in the case illustrated in FIG. 8, for which the cam assumes a translational motion. Conversely, the vector OM may, if desired, be smaller than R and be equal, for instance, to $$\frac{R\sqrt{2}}{2}$$

as illustrated in FIG. 7, in which the cam is shown in its intermediate position or transient position. For said position and for such an outline, the angles α are equal to 45° and the radii $ON_1$ and $ON_2$ form together an angle of 90°. Said small-sized cam allows driving into rotation each of the rotary members or levers round the point O, until a value of 225° is obtained for the angular movement. For a complete operative cycle including a rotation through 90° of each lever or the like rotary member, the cam rotates through 197°12′ round the point M. If one of the levers rotates through 90° and the other through 225° round the same point O, the cam should rotate by 278°36′ round the point M, in order to provide for the execution of the corresponding operative cycle. The outline of the cam with said value of $$OM = \frac{R\sqrt{2}}{2}$$

provides angles of engagement for the rollers which are just as favorable as those of the cam illustrated in FIG. 3, for which $OM=R$. Any other modifications may be provided and, for instance, the terminal sections $25_0$ and $25_s$ in the groove 25, instead of being symmetrical and arcuate with a common radius R, as in the case of FIGS. 3 and 7, may be dissymmetrical and be given different lengths, or else, differ from circularity or be incurved in a direction opposed to the curvature illustrated in FIG. 3. The cam may also be provided with two grooves, the central sections of which have a common center M and are connected respectively with the sections producing the angular and the nearing movement of the plug; the cam may also be subdivided into several elements, or else, be duplicated, etc.

In the embodiments illustrated in FIGS. 1 to 5, and as appears from the preceding disclosure, the nearing movement of the plug 12 towards the seat 10 is executed along the arcuate line AB having as its center O (FIG. 2a). It will be appreciated that, by reason of the selection of the slope OA as at 45°, the sagitta or camber z is very small and equal to $0.293x$. In order to obtain a correct operation, the slideway connection 20—21 is designed in a manner such that it may not only ensure the driving of the plug 12 into rotation through the member 8 during the angular movement of the plug, but also absorb the camber z during both periods of the complete operation.

To this end, the connection 20—21 is provided with a clearance equal to z.

Figure 9:
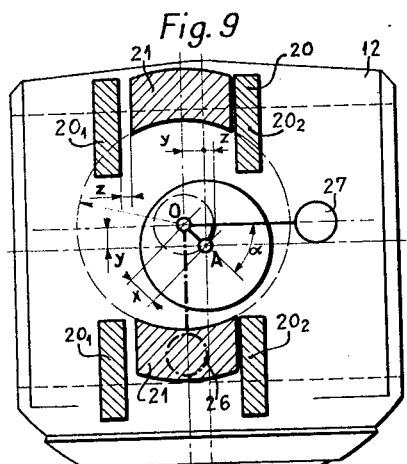
FIG. 9 is a sectional view of the sliding connection between the plug and the lever controlling the angular movement, the valve being in its open position.
Figure 10:
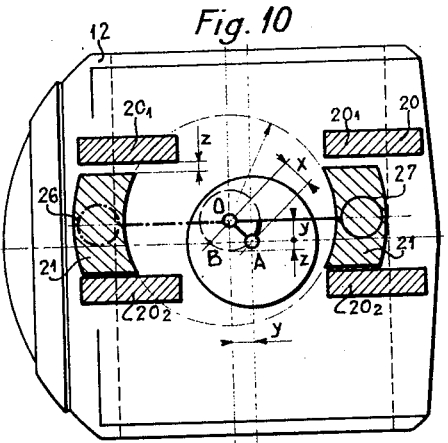
FIG. 10 is a cross-sectional view similar to FIG. 9 through line X—X of FIG. 1, showing the connection in its transient position prior to closing.
Figure 12:
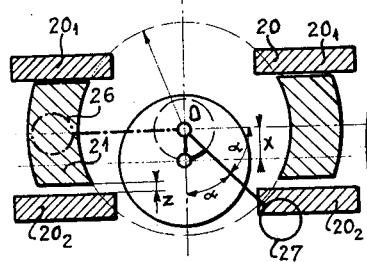
FIGS. 11 and 12 are similar to FIG. 9, but show the sliding connection respectively in its inner valve closing position and in a medial position between the transient intermediate position and the closing position.
Figure 11:
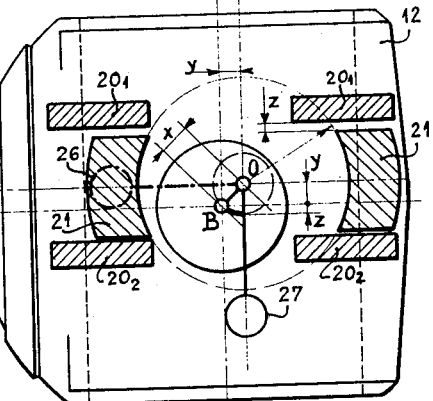

In the opening position illustrated in FIG. 9, the clearance z is adjacent the edge $20_1$. After a rotation through 45°, said clearance is shifted towards the other edge $20_2$. This being done, and when the rotation has reached 90°, i.e., for the transient position illustrated in FIG. 10, the clearance z is returned again along the edge $20_1$. During the nearing movement and at mid-travel, the clearance z enters a position along the edge $20_2$ (FIG. 12). Lastly, at the end of the nearing movement, the clearance z returns towards the edge $20_1$ (FIG. 11).

Figure 13:
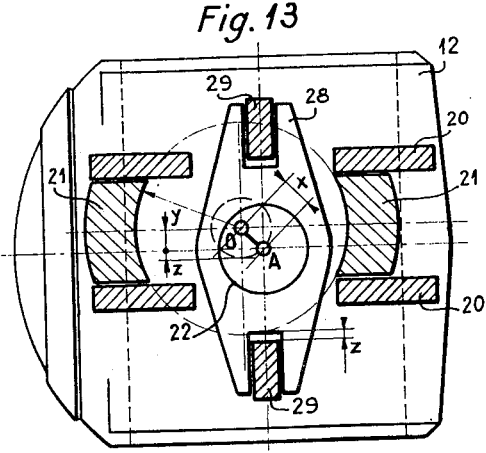
FIG. 13 illustrates a modification of the slideway arrangement without any clearance.

In a modification illustrated in FIG. 13, the slideway 20—21 is designed so as to be devoid of any clearance and the camber z is absorbed by the shifting of a slider 28 guided without any clearance over the studs 29 carried by the plug 12. The slider 28 is substituted, in this case, for the plug 12 for connection with the rotary member 9 through the eccentric connection 22. It will be remarked that the arrangement illustrated in FIG. 13 allows shifting the cover 11 towards the seat 10 exactly in the vertical plane of symmetry of the pipes 13.

Figure 14:
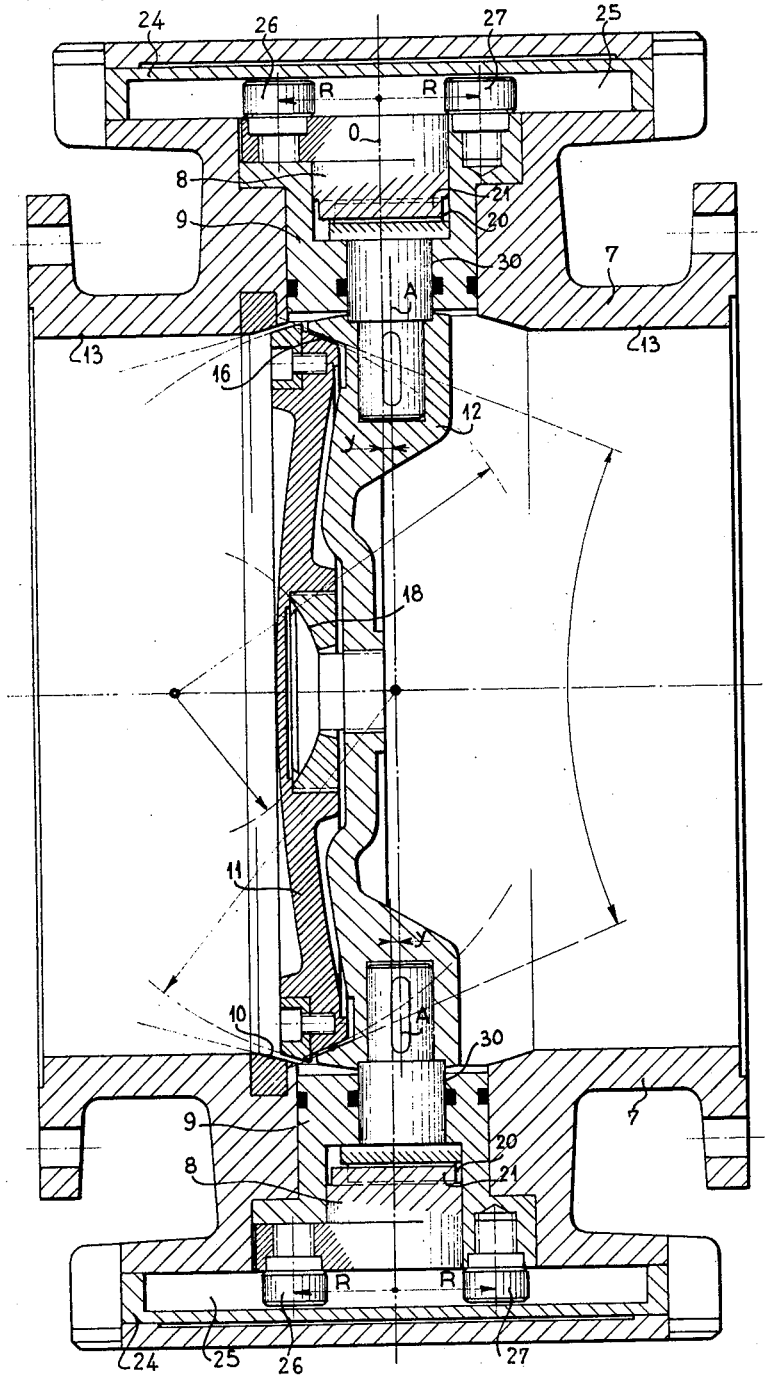
FIG. 14 is a view similar to FIG. 1 and shows the invention as applied to a throttle valve.
Figure 15:
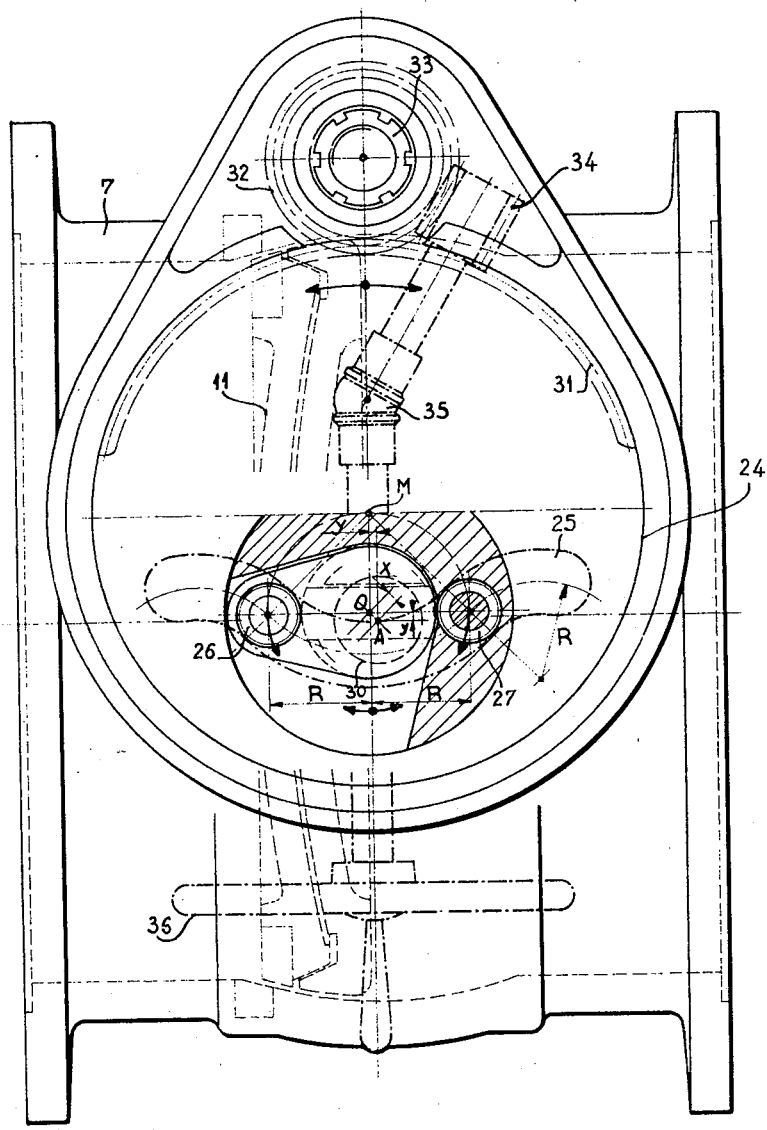
FIG. 15 is a partly sectional plan view of the said throttle valve, partly sectionally.

Turning now to FIGS. 14 and 15 which are generally similar to FIGS. 1 to 5, said figures relate to an application of my invention to a throttle valve requiring a modification of certain details of the assembly. In the case illustrated in FIGS. 14 and 15, the operation of the plug 12 is controlled by two diametrically-opposed synchronously-controlled positively-actuated systems. In the case illustrated, the spherical rotulas 22 and 23 are replaced by cylindrical trunnions 30, the geometrical axis A of which is arranged eccentrically with reference to the axis O, as described with reference to FIG. 2a. The angular movement of the plug is obtained through the members 8 revolving round the axis O and connected with the trunnions 30 through the slideway connections 20—21 provided with a clearance z. The nearing movement of the plug is controlled by the members 9 revolving also round the axis O and the central bore of which revolvably carrying the trunnions shows an eccentricity equal to x with reference to said axis O. The two cams 24 are associated and are provided, as shown in FIG. 15, with toothed sectors 31 meshing with pinions 32 keyed to a common shaft 33. The latter is driven by the worm 34, the cardan joint transmission 35 and the handwheel 36. The dual movement operation is similar to that which has been described precedingly. The use of two associated control means is advantageous in the case of large pressures.

Figure 16:
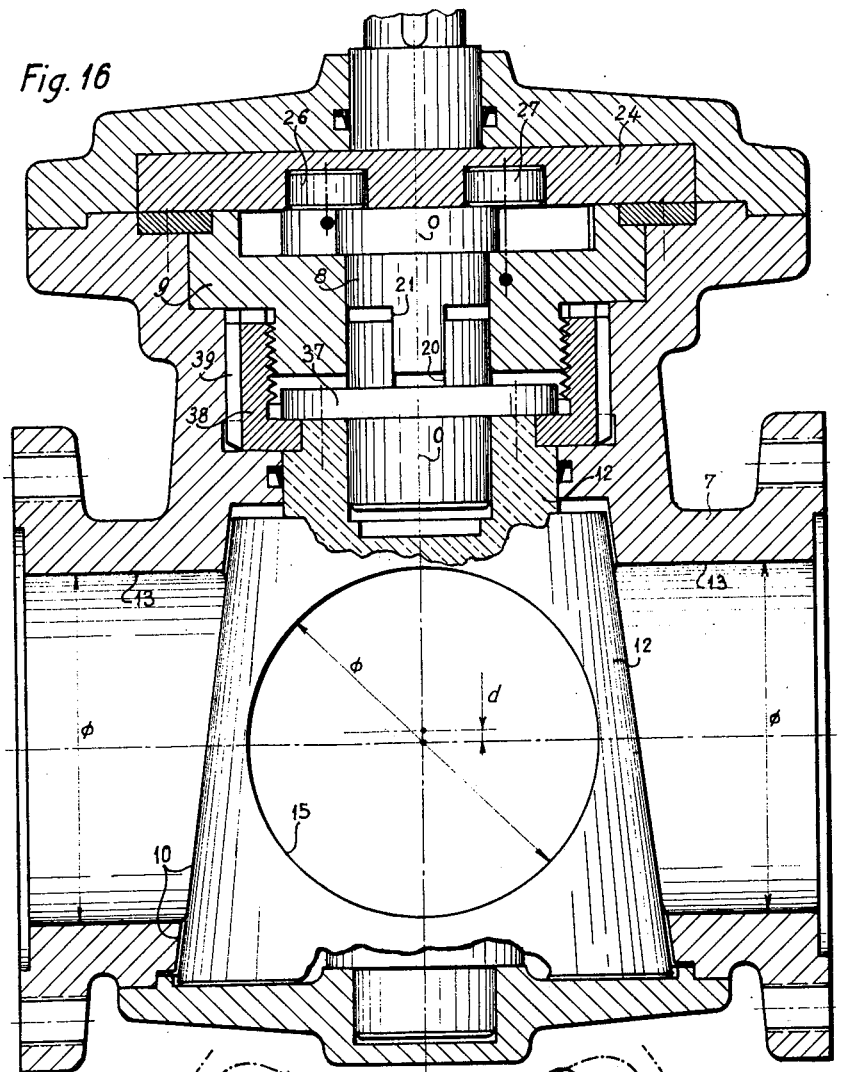
FIG. 16 is also a view similar to FIG. 1, showing the invention as applied to a plug and shell valve.
Figure 17:
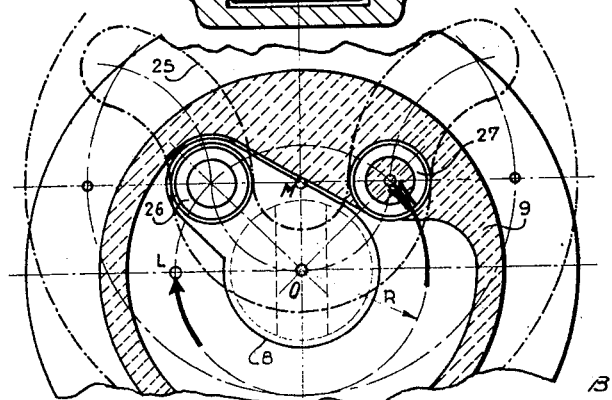
FIG. 17 is a plan view, partly sectional, of the means controlling the plug of such a valve.

As to FIGS. 16 and 17, the arrangement is again the same, generally speaking, as that illustrated in FIGS. 1 to 5, but it concerns an application of the invention to a shell and plug valve requiring certain modifications in the details of its assembly.

In said FIGS. 16 and 17, the movable closing member 12 is constituted by a frusto-conical plug provided with a central perforation 15 crossing its axis and adapted to engage fluidtightly the corresponding frusto-conical surface 10 inside the body 7. The member 8 controlling the angular setting of the plug is connected through a slideway connection 20—21, showing no clearance, with a member 37 rigid with the plug 12. The rotary member 9 providing for the nearing movement through rotation round the axis O threadedly engages the nut 38 which is guided translationally and held against rotation with reference to the body 7 by the flutings 39. The plug 12 is allowed to rotate freely round the nut 38 thus fitted between the plug 12 and the member 37 rigid therewith, but it moves translationally with said nut controlled by the rotary member 9.

When the cam 24 is caused to revolve round the axis M with a view to closing the valve, the member 8 providing angular movement revolves first round the axis O, while the other control member 9 is held fast. Through the connection 20—21, the plug 12 is subjected to a rotation through 90°, while it remains spaced with reference to the bearings 10 (FIGS. 16 and 17). The member 8 producing the angular movement is then held fast, while the other member 9 is driven into rotation, to produce the nearing movement. The screw connection 38 produces a rising movement of the plug 12 along the sliding connection, without any rotation between the spaced position up to an intimate contacting position with the body 7, through the height $d$. The closing of the valve is thus ensured. The opening of the valve is performed through a reverse procedure, the cam 24 being turned in the opposite direction.

In the example illustrated in FIGS. 16 and 17, the positively-actuated cam 24 is of the type illustrated in FIG. 7 and revolves through 278°36' round the point M for each complete cycle of operation including a rotation through 90° of the lever 8 and a maximum rotation through 225° of the lever 9.

What I claim is:

1. In combination with a valve including a movable closing core member adapted to be shifted towards its seat, the provision of a first control member slidingly engaging the movable closing member with a clearance and adapted to revolve therewith around a first stationary axis to control a rotary movement of the closing member between its open position and an intermediate position registering with its seat, a second control member revolvably mounted around said first axis and eccentrically controlling a tilting movement of said closing member between its intermediate position and its closed position for which the closing member engages its seat, a follower part carried at a predetermined point of each control member, a cam adapted to move around a second axis parallel with said first axis and spaced with reference thereto and including two terminal sections cooperating respectively with the corresponding follower parts carried by the control members, and an arcuate locking section forming an extension of each terminal section and the center of which is located on the cam axis, the follower parts carried by the control members engaging in alternation respectively the cooperating terminal section and the locking section during the movements to be imparted through the cam to the control members, said follower parts engaging simultaneously points of interconnection between the cooperating terminal and locking sections when the cam is in a position corresponding to a transfer of movement from one control member to the other.

2. In combination with a valve including a movable core adapted to be shifted towards its seat, the provision of a first control member slidingly engaging the core at one end thereof and adapted to revolve with same around a first stationary axis to control a rotary movement of the core between its open position and an intermediate position registering with the seat, a stationary support facing the other end of the core, a rotula connection between said other end and said stationary support, a second eccentric control member revolvably mounted around said first axis, a rotula connection between said second control member and the core, and controlling a tilting movement of said core between its intermediate position and its closed position for which the core engages its seat, a cam adapted to move around a second axis parallel with said first axis and spaced with reference thereto and including two terminal sections cooperating respectively with the corresponding control members, and an arcuate locking section forming an extension of each terminal section and the center of which is located on the cam axis, the control members engaging in alternation respectively the cooperating terminal section and the locking section to impart said movements through the control members to the cores in succession, said control members engaging simultaneously points of interconnection between the cooperating terminal and locking sections when the cam is in a position corresponding to a transfer of movement from one control member to the other.

3. In combination with a valve including a movable core, adapted to be shifted towards its seat, the provision of a first control member slidingly engaging the core at each end thereof and adapted to revolve therewith around a first stationary axis to control a rotary movement of the core between its open position and an intermediate position registering with the seat, a second control member rotatably mounted at each end of the core and revolvably mounted around said first axis and eccentrically controlling an arcuate translatory movement of said core between its intermediate position and its closed position for which the core engages its seat, a cam at each end of the core adapted to move around a second axis parallel with said first axis and spaced with reference thereto and including two terminal sections cooperating respectively with the corresponding control members, and an arcuate locking section forming an extension of each terminal section and the center of which is located on the cam axis, the control members engaging in alternation respectively the cooperating terminal section and the locking section during the movements to be imparted through the control members to the core in succession, said control members engaging simultaneously points of interconnection between the cooperating terminal and locking sections when the cam is in a position corresponding to a transfer of movement from one control member to the other.

4. In combination with a valve including a movable core adapted to be shifted towards its seat to control aligned pipes, the provision of a first control member slidingly engaging the core at least at one end thereof and adapted to revolve therewith around a first stationary axis to control a rotary movement of the core between its open position and an intermediate position registering with the seat, a second eccentric control member revolvably mounted around said first axis and controlling a tilting movement of said core between its intermediate position and its closed position for which the core engages its seat, the axis of eccentricity of the second control member forming an angle of 45° with the aligned pipes for said intermediate position of the core, a cam adapted to move around a second axis parallel with said first axis and spaced with reference thereto and including two terminal sections cooperating respectively with the corresponding control members, and an arcuate locking section forming an extension of each terminal section and the center of which is located on the cam axis, the control members engaging in alternation respectively the cooperating terminal section and the locking section during the movements to be imparted through the control members to the core in succession, said control members engaging simultaneously points of interconnection between the cooperating terminal and locking sections when the cam is in a position corresponding to a transfer of movement from one control member to the other.

5. In combination with a valve including a core angularly and rotatably moving inside its frusto-conical seat, the provision of a first control member slidingly engaging the core with a close fit and adapted to revolve therewith around a first stationary axis to control a rotary movement of the core between its open position and an intermediate position registering with the seat, a second control member revolvably mounted around said first axis, a nut-and-screw device operatively connecting said second control member with the core and controlling an axial movement of said core between its intermediate position and its closed position for which the core engages its seat, a follower part carried at a predetermined point of each control member, a cam adapted to move around a second axis parallel with said first axis and spaced with reference thereto and including two terminal sections cooperating respectively with the corresponding follower parts carried by the control members, and an arcuate locking section forming an extension of each terminal section and the center of which is located on the cam axis, the follower parts carried by the control members engaging in alternation respectively the cooperating terminal section and the locking section during the movements to be imparted through the cam to the control members, said follower parts engaging simultaneously points of interconnection between the cooperating terminal and locking sections when the cam is in a position corresponding to a transfer of movement from one control member to the other.

6. In a valve having inlet and outlet ports in its body, a chamber communicating with the ports and having a seat, a valve core mounted in the chamber for rotative and nearing movements therein relative to said seat to control flow through the ports, a control system comprising a first control member mounted for rotation with respect of said body around a first axis, first connecting means connecting said first control member with said core for imparting rotative movement to said core when said first control member rotates, a second control member mounted for rotation with respect of said body around said first axis, second connecting means connecting said second control member and said core for imparting nearing movement to said core when said second control member rotates, a cam means mounted for rotation on said body around a second axis parallel with and spaced from said first axis, said cam means having a first active section, a second active section and a locking section, a first follower means on said first control member cooperating with said first section, a second follower means on said second control member cooperating with said second section, said locking section being of arcuate circular profile and coaxial with said second axis and being constructed and arranged for receiving one of said follower means when the other follower means is engaged with its active section and vice versa, and actuating means for moving said cam means whereby upon actuation of said actuating means one of said control members rotates while the other is locked and thereafter vice versa.

7. A control system as defined in claim 6, wherein said locking section is located between said both active sections and has points of interconnection with said active sections, said follower means occupying simultaneously and respectively said points of interconnection when the cam means is in a position corresponding to a transfer of movement from one control member to the other.

8. A control system as defined in claim 6, wherein the two said follower means have the same gyration radius with respect of the said first axis.

9. A control system as defined in claim 6, wherein the two said follower means have the same gyration radius with respect of the said first axis and each of the two active sections of the cam means has a circular arcuate profile having a radius equal to the said gyration radius.

10. A control system as defined in claim 6, wherein the two said follower means have the same gyration radius with respect of the said first axis and the distance between the said first axis and the said second axis is equal to the said gyration radius.

11. A control system as defined in claim 6, wherein the two said follower means have the same gyration radius with respect to the said first axis and the distance between the said first axis and the said second axis is larger than the said gyration radius.

12. A control system as defined in claim 6, wherein the said distance is equal to the product of the said gyration radius with $\sqrt{3}$.

13. A control system as defined in claim 11, wherein the said second axis is infinitely removed.

14. A control system as defined in claim 6, wherein the two said follower means have the same gyration radius with respect of said first axis and the distance between the said first axis and the said second axis is smaller than the said gyration radius.

15. A control system as defined in claim 14, wherein the said distance is equal to the product of the said gyration radius with $$\frac{\sqrt{2}}{2}$$

16. A control system as defined in claim 6, wherein the said first connecting means comprise a slideway connection between said first control member and said core.

17. A control system as defined in claim 16, wherein said slideway connection has a clearance.

18. A control system as defined in claim 6, wherein said second connecting means comprise a rotary connection, the geometrical center of which is positioned eccentrically to said first axis.

19. A control system as defined in claim 6, wherein said second connecting means comprise a screw-and-nut device.

References Cited in the file of this patent
UNITED STATES PATENTS

| | | |
|---|---|---|
| 2,139,632 | Flodin | Dec. 6, 1938 |
| 2,412,529 | Mueller | Dec. 10, 1946 |
| 2,459,682 | Carrie | Jan. 18, 1949 |
| 2,655,942 | Dougherty | Oct. 20, 1953 |
| 2,711,302 | McWhorter | June 21, 1955 |
| 2,719,022 | Blevans | Sept. 27, 1955 |